(No Model.) 2 Sheets—Sheet 1.

J. VAN SICLEN.
POTATO DIGGER.

No. 345,936. Patented July 20, 1886.

WITNESSES:

INVENTOR:
J. Van Siclen
BY Munn & Co.
ATTORNEYS.

(No Model.) 2 Sheets—Sheet 2.
J. VAN SICLEN.
POTATO DIGGER.
No. 345,936. Patented July 20, 1886.
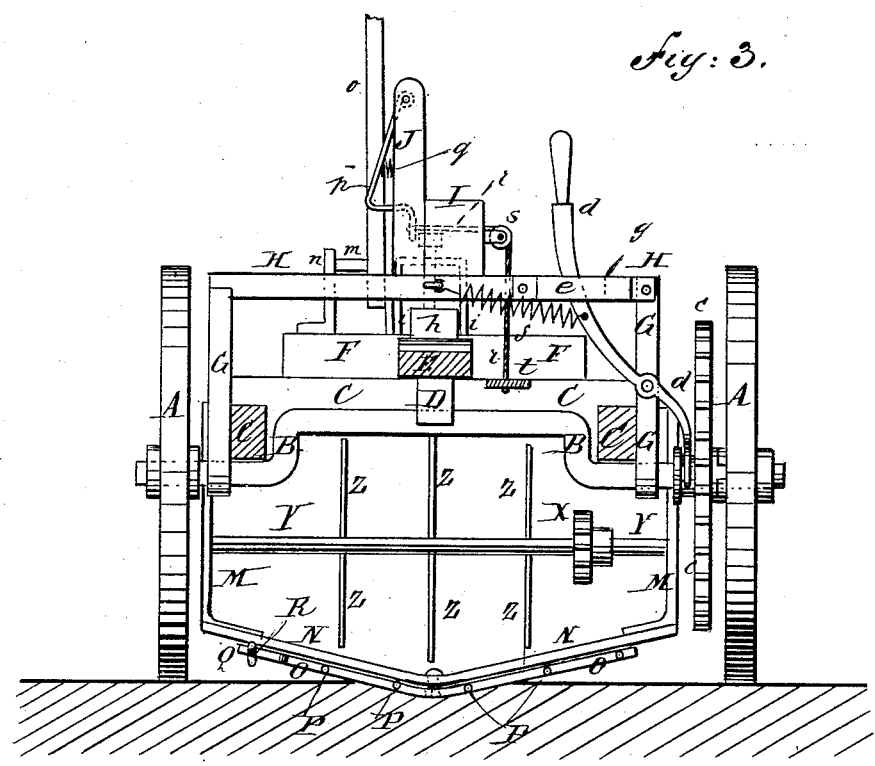
Fig. 3.
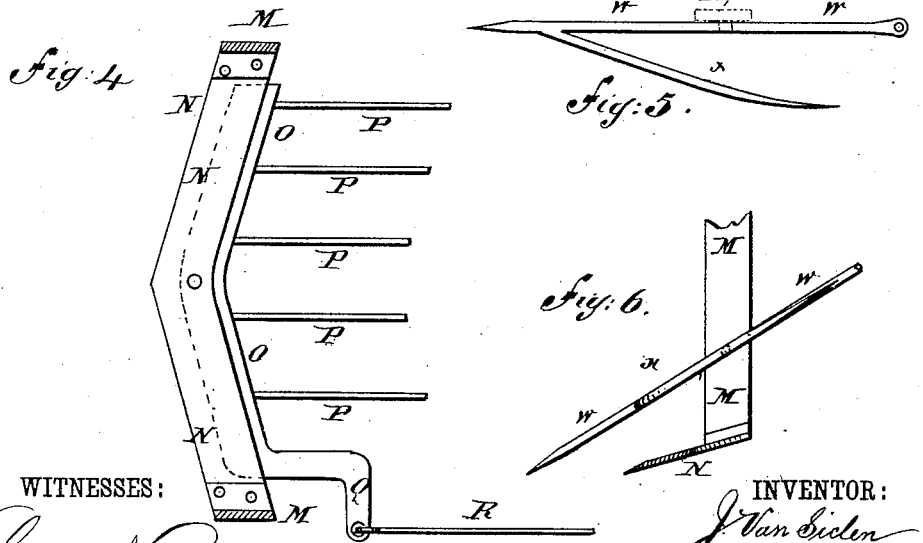
Fig. 4.
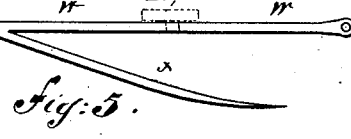
Fig. 5.
Fig. 6.
WITNESSES:
Chas. Niva
E. Sedgwick
INVENTOR:
J. Van Siclen
BY Munn & Co.
ATTORNEYS.

UNITED STATES PATENT OFFICE.

JAMES VAN SICLEN, OF JAMAICA, NEW YORK.

POTATO-DIGGER.

SPECIFICATION forming part of Letters Patent No. 345,936, dated July 20, 1886.

Application filed April 27, 1886. Serial No. 200,286. (No model.)

*To all whom it may concern:*

Be it known that I, JAMES VAN SICLEN, of Jamaica, in the county of Queens and State of New York, have invented a new and useful Improvement in Potato-Diggers, of which the following is a full, clear, and exact description.

Reference is to be had to the accompanying drawings, forming a part of this specification, in which similar letters of reference indicate corresponding parts in all the figures.

Figure 1:
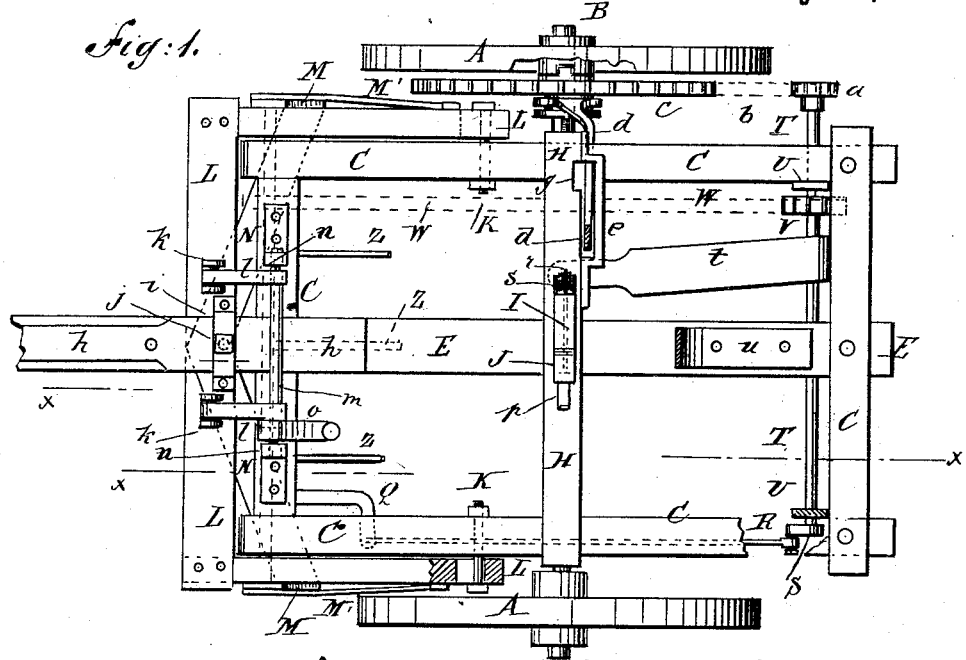
Figure 2:
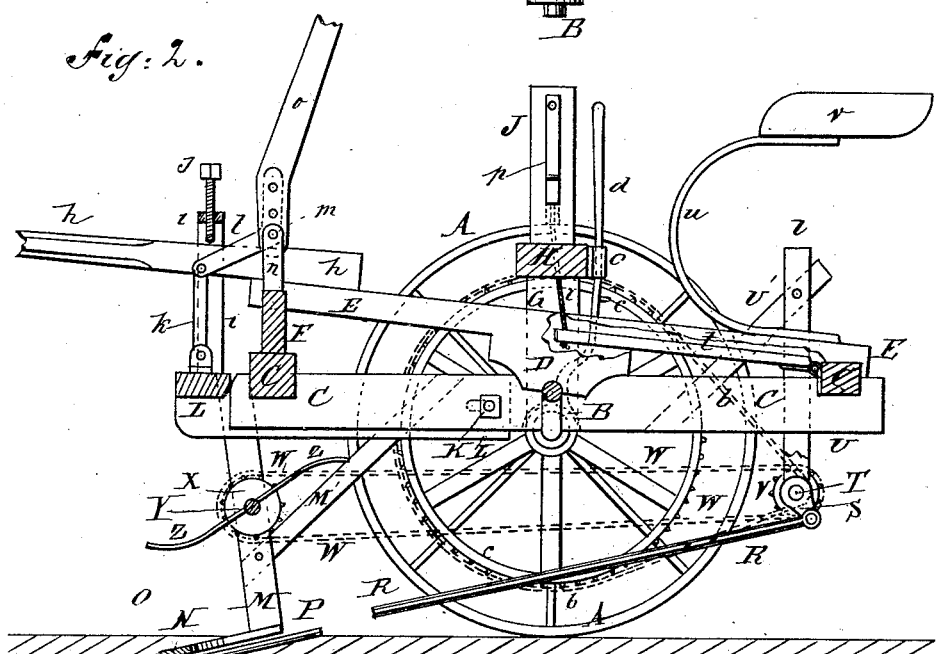

Figure 1 is a plan view of my improved potato-digger, parts being broken away. Fig. 2 is a sectional side elevation of the same, taken through the line $x$ $x$, Fig. 1. Fig. 3 is a sectional rear elevation of the same. Fig. 4 is a plan view of the plow and separator, the supporting-bars being shown in section. Fig. 5 is a plan view of a vine-guard. Fig. 6 is a side elevation of the same, and showing a section of the plow and a portion of a plow-supporting bar.

The object of this invention is to provide potato-diggers constructed in such a manner that they will raise the potatoes, separate them from the soil, and leave them upon the top of the soil ready to be gathered, and which shall be simple in construction, readily controlled, and reliable in operation.

The invention consists in the construction and combination of various parts of the potato-digger, as will be hereinafter fully described.

A represents the wheels, to the axle B of which is attached the frame C. The axle B is made with an upward offset or bend in its middle part, upon which rests a block, D, attached to the central longitudinal bar E of the frame C. The rear end of the bar E is attached to the rear cross-bar of the frame C, and its forward end is attached to a block, F, secured to the front cross-bar of the frame C.

To the middle parts of the outer sides of the side bars of the frame C are attached standards G, the lower ends of which are perforated to receive the axle B. The upper ends of the standards G are connected by a crossbar, H, to the middle part of which are attached a low standard, I, and higher standard, J.

To the side bars of the frame C, a little in front of the axle B, are hinged, by two bolts, K, the ends of the side bars of the U-shaped frame L, which passes around the forward end of the frame C, and to the side bars of which, near their forward ends, are attached the upper ends of the bars M.

Upon the lower ends of the bars M are formed, or to them are attached, the ends of the obtuse-angled plow-plate N, which is set at such an inclination as to pass beneath the potatoes, and to raise them and the soil in which they are embedded to the surface of the ground. The bars M are strengthened against the resistance of the soil by braces M', attached to them and to the side bars of the frame L.

To the center of the plow-plate N is pivoted the center of an angular bar, O, to which is attached a series of five (more or less) rearwardly-projecting fingers, P. With this construction, as the bar O is vibrated, the fingers P separate the potatoes from the soil and vines and leave the potatoes upon the top of the ground, ready to be gathered when the vines have been raked off.

Upon one end of the pivoted bar O is formed, or to it is attached, an arm, Q, to the end of which is pivoted the forward end of the pitman R. The rear end of the pitman R is pivoted to the crank or crank-wheel S, attached to the end of the shaft T, which revolves in bearings in the lower ends of the uprights U, attached to the side bars of the frame C. The uprights U are strengthened in place by braces U', attached to them and to the frame C.

To the shaft T is attached a chain-wheel, V, around which passes an endless chain, W. The endless chain W also passes around a chain-wheel, X, attached to the shaft Y, which revolves in bearings in the plow-supporting bars M, and to which are attached series of radial arms Z, slightly curved toward their ends, as shown in Fig. 2. As the shaft Y revolves, the arms Z push back the vines so that they will lie loose above the potatoes, ready to be raked off.

To the other end of the shaft T is attached a chain-wheel, $a$, around which passes an endless chain, $b$. The chain $b$ also passes around a large chain-wheel, $c$, placed loose upon the axle B, and which has clutch-teeth upon the outer end of its hub, to engage with clutch-teeth upon the inner end of the hub of the drive-wheel A, so that the shafts T Y will be revolved by the revolution of the said drive-wheel.

Around the inner end of the hub of the large chain-wheel $c$ is formed an annular groove to receive the forked end of the lever $d$, which is curved inward and upward, is pivoted to the standard G, and projects upward at the rear side of the cross-bar H, where it is kept in place by a keeper, $e$, attached to the said cross-bar.

$f$ is a spiral spring, one end of which is attached to the cross-bar H, and its other end is attached to the upper part of the lever $d$, so that the chain-wheel $c$ will be held in gear with the drive-wheel A by the tension of the said spring $f$, and can be thrown out of gear when desired by operating the said lever. The lever $d$ is held in place when the wheels $c$ A are out of gear by being placed in a recess, $g$, in the cross-bar H.

$h$ is the tongue, the rear end of which is rigidly attached to the forward part of the center-bar E.

To the cross-bar of the frame L is attached the end of a U shaped bar or bail, $i$, through which the tongue $h$ passes, and in the center of which is formed a screw-hole to receive a hand-screw, $j$. The forward end of the hand-screw $j$ rests against the upper side of the tongue $h$, so that by turning the said hand-screw forward or back the frame L can be raised or lowered to adjust the plow-plate N to work at a less or greater depth in the ground, as may be required to cause the said plow-plate to pass beneath the potatoes.

To supports attached to the cross-bar of the frame L are pivoted the lower ends of two short connecting-bars, $k$, the upper ends of which are pivoted to the ends of arms $l$, rigidly attached to the short shaft $m$. The shaft $m$ rocks in bearings in short standards $n$, attached to the block F, and to the said shaft is rigidly attached the lower end of the lever $o$, so that by swinging the said lever $o$ to the rearward the frame L will be raised, raising the plow-plate N from the ground. As the lever $o$ is swung down to the rearward, it strikes against, pushes back, and passes the catch $p$, which at once is forced outward to engage with and hold the said lever by a spring, $q$, interposed between the catch $p$ and the standard J, to which the said catch is attached.

To the lower end of the spring-catch $p$ is attached the end of a cord or chain, $r$, which passes through the standards I J, passes over a guide-pulley, $s$, pivoted to supports attached to the standard I, and its other end is attached to the forward end of the treadle $t$. The rear end of the treadle $t$ is hinged to the rear cross-bar of the frame C, so that the driver by operating the treadle $t$ with his foot can draw back the catch $p$ and allow the plow-plate to drop into a working position.

To the rear part of the center bar, E, of the frame C is attached the lower end of the spring-standard $u$, to the upper end of which is attached the driver's seat $v$.

If desired, guards $w$, having inwardly and rearwardly projecting arms $x$ formed upon them, may be attached to the plow-supporting bars M, to guide the vines inward and prevent them from catching upon the said bars M and obstructing the machine.

Having thus fully described my invention, what I claim as new, and desire to secure by Letters Patent, is—

1. In a potato-digger, the combination, with the wheels A, axle B, and frame C, of the U-shaped frame L, hinged to the frame C, the bars M, attached to the said hinged frame, the angular plow-plate N, attached to the said bars, the pivoted angular bar O, pivoted to the said plow-plate, and provided with fingers P, and an arm, Q, and the pitman R, crank-wheel S, shaft T, and chain-wheels $a$ $c$, and endless chain $b$, substantially as herein shown and described, whereby the potatoes will be raised from the ground, separated from the soil and vines, and left upon the surface of the soil, as set forth.

2. In a potato digger, the combination, with the bars M, supporting the plow-plate N, and the shaft T, driving the separator, and the chain-wheels $a$ $c$ and chain $b$, of the shaft Y, pivoted to the said bars M, the arms Z, attached to the said shaft Y, and the chain-wheels V X and chain W, connecting the said shafts T Y, substantially as herein shown and described, whereby the vines will be separated from the potatoes, as set forth.

3. In a potato-digger, the combination, with the frame C, the hinged frame L, the bars M, and plow-plate N, connected with the said hinged frame L, and the tongue $h$, rigidly connected with the said frame C, of the bail $i$ and hand-screw $j$, substantially as herein shown and described, whereby the said hinged frame can be readily adjusted to cause the plow-plate to work at any desired depth in the ground, as set forth.

4. In a potato-digger, the combination, with the frame C and the hinged frame L, carrying the bars M and plow-plate N, of the connecting-bars $k$, the shaft $m$, having rigid arms $l$, connected with the said bars $k$, the lever $o$, rigidly attached to the said shaft, the spring-catch $p$, and the standard J, carrying the said spring-catch, substantially as herein shown and described, whereby the said plow-plate can be readily raised from the ground and supported, as set forth.

5. In a potato-digger, the combination, with the frame C, the standards I J, and the spring-catch $p$, that engages with and holds the plow-raising lever, of the cord $r$, the guide-pulley $s$, and the treadle $t$, substantially as herein shown and described, whereby the said plow-raising lever can be readily released, to allow the plow-plate to drop to the ground, as set forth.

JAMES VAN SICLEN.

Witnesses:
JAMES T. GRAHAM,
C. SEDGWICK.